UNITED STATES PATENT OFFICE.

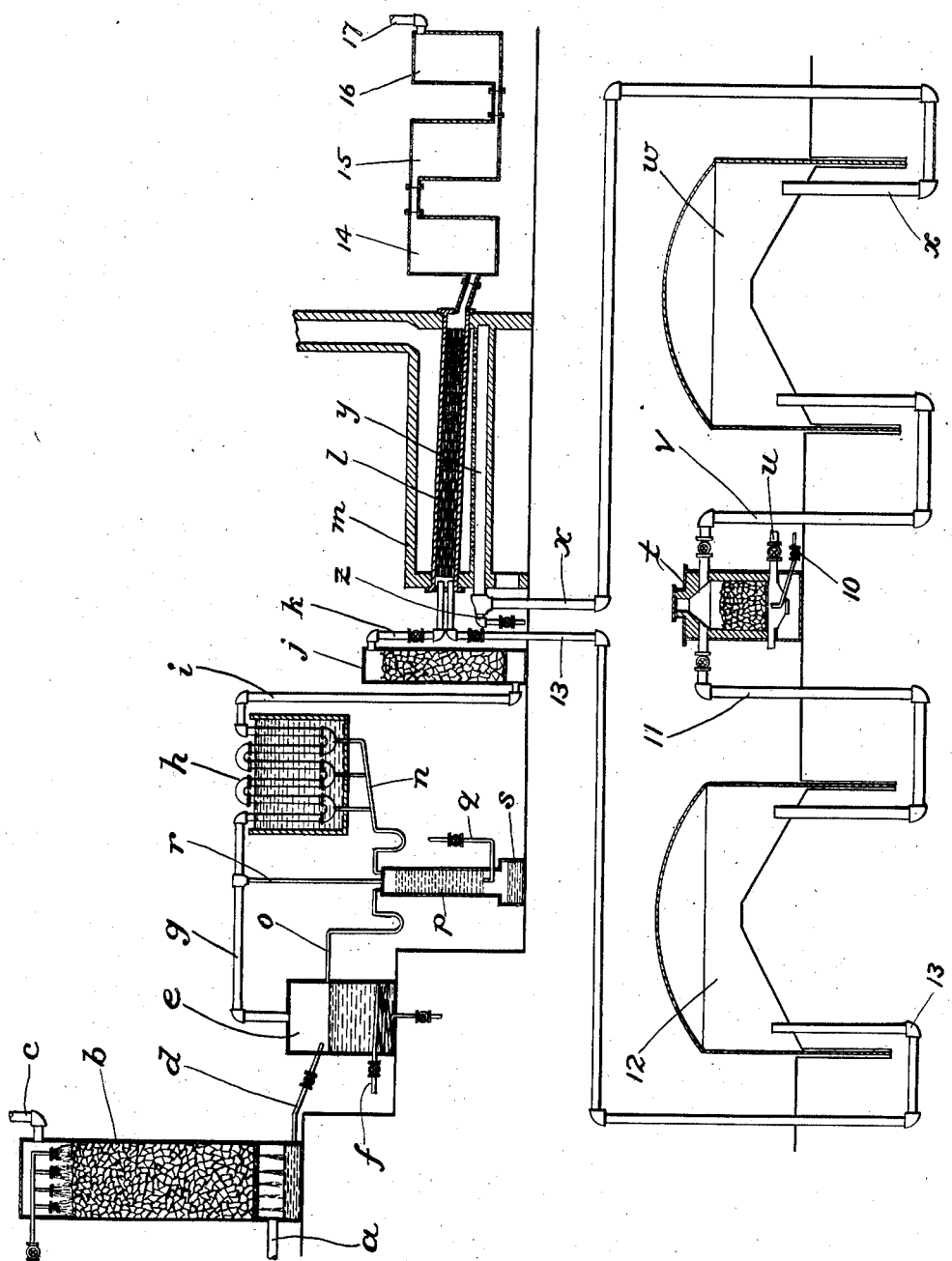

PAUL S. SMITH, OF WILMINGTON, DELAWARE, ASSIGNOR TO THE E. I. DU PONT DE NEMOURS POWDER COMPANY, OF WILMINGTON, DELAWARE, A CORPORATION OF NEW JERSEY.

RECOVERY OF SULFUR FROM SULFUR-BEARING GASES.

No. 878,569.     Specification of Letters Patent.     Patented Feb. 11, 1908.

Application filed May 25, 1907. Serial No. 375,597.

*To all whom it may concern:*

Be it known that I, PAUL S. SMITH, a citizen of the United States, residing at Wilmington, county of Newcastle, and State of Delaware, have invented a new and useful Improvement in Processes for the Recovery of Sulfur from Sulfur-Bearing Gases, of which the following is a full, clear, and exact description, reference being had to the accompanying drawings, which form a part of this specification.

My invention has for its object to recover sulfur from kiln gases or smelter gases, and to this end, my invention consists in causing the sulfur dioxid separated from said gases to react with water gas, thereby reducing the sulfur dioxid to sulfur vapor, which is afterward condensed.

In the drawings, the figure is a diagrammatic view of an apparatus adapted for the carrying out of my process.

The mixture of gases containing sulfurous oxid is led by the pipe $a$ to the tower $b$, which is filled with coke, pumice, or other suitable material, which is continually moistened by a downward stream of water. In their upward passage through the tower, the gases are washed free of their content of sulfurous acid, which collects in aqueous solution at the bottom of the tower, the gases insoluble in water escaping by the pipe $c$.

The aqueous solution of sulfuric oxid obtained in the manner described above, flows through the pipe $d$ to vessel $e$, where it is heated by the steam coil $f$, or other suitable source of heat, the greater part of the dissolved sulfurous oxid being evolved in consequence. The gaseous sulfurous oxid thus produced, together with a certain amount of aqueous vapor, is conducted by the pipe $g$ to the condenser $h$ immersed in cold water. The greater part of the aqueous vapor having condensed in the condenser $h$, the sulfurous oxid gas passes by the pipe $i$ to the drying tower $j$, filled with lumps of calcium chlorid or other suitable dehydrating material, whereby the last traces of moisture are absorbed, the dry sulfurous oxid passing by the pipe $k$ to the reducer $l$, which consists of a fire-clay retort filled with fire-brick checker-work, the retort being so arranged in the furnace $m$ as to be heated to a high temperature in a manner to be described.

The last traces of sulfurous oxid are not expelled from the water in the vessel $e$ by heating, and moreover, the water condensed in the condenser $h$, absorbs a certain amount of the sulfurous oxid with which it is in contact. To expel these last traces of sulfurous oxid, the partially exhausted water in the vessel $e$ and the water condensed in the condenser $h$, flow by the pipes $o$ and $n$ respectively to the tower $p$, filled with lead wire net-work, through which water descends in the form of rain or mist. Steam is introduced by the pipe $q$, and, passing upward through the tower, deprives the descending water of the last traces of sulfurous oxid, which, together with a certain amount of steam, passes by the pipes $r$ and $g$ to the condenser $h$. The spent water from the tower $p$ escapes by the pipe $s$.

For the purpose of carrying out my process more economically, a gas producer is used as a part of the apparatus, the same being designated by $t$ in the drawing. It has been stated that the reducer $l$ is necessarily highly heated during the process, and for this purpose the producer gas necessarily formed by the air-blast introduced through the pipe $u$ for the purpose of bringing the coal in the gas producer to the condition of incandescence essential to the production of water gas, is led from the producer $t$ through the pipe $v$ to the producer-gas-holder $w$, and thence is allowed to pass, as required, through the pipe $x$ to the burner $y$, where it is burned with the assistance of an air-blast introduced through the pipe $z$, for the purpose of heating the retort $l$.

10 is a pipe, leading from a source of steam supply through which steam is admitted to the producer after the coal therein is heated to incandescence, as before described, to produce water-gas. The water gas so generated is led by the pipe 11 to the gas-holder 12, from which it is conducted by the pipe 13 to the retort $l$, where it effects the reduction of the sulfurous oxid introduced by the pipe $k$, as described. The sulfur vapor, water, and carbon dioxid formed in the retort $l$ by the interaction of the sulfurous oxid and water gas, pass to the condensers 14, 15 and 16, where the sulfur and water condense, the carbon dioxid escaping by the pipe 17.

The reaction in the reducer may be expressed as follows:

$$SO_2 + CO + H_2 = CO_2 + H_2O + S$$

or $$SO_2 + CO_2 + 2H_2 = CO_2 + 2H_2O + S$$

Which of the two above reactions occurs depends upon the temperature at which the water-gas is formed. When the water-gas is formed at a tempertaure above approximately 1000° C., $CO + H_2$ is formed. When water-gas is formed at a temperature below approximately 1000° C., $CO_2 + 2H_2$ is formed. In practically carrying out my process, a mixture of these gases will ordinarily be formed and led to the reducer.

Having now fully described my invention, what I claim and desire to protect by Letters Patent is:

1. The process of recovering sulfur from gases containing sulfur dioxid which consists in first separating therefrom sulfur dioxid, then bringing the sulfur dioxid in contact with water gas and highly heating the mixed gases whereby the sulfur dioxid is reduced to sulfur, and then condensing the sulfur, substantially as described.

2. The process of recovering sulfur from gases containing sulfur dioxid which consists in first separating sulfur dioxid from the mixed gases, then causing the sulfur dioxid to react with water gas to reduce the sulfur dioxid to sulfur, and then condensing the sulfur, substantially as described.

3. The process of recovering sulfur from sulfur dioxid which consists in successively forming producer gas and water gas, mixing the sulfur dioxid and water gas, heating said mixed gases by means of the producer gas, thereby causing the mixed gases to react with evolution of sulfur vapor, and then condensing the sulfur, substantially as described.

In testimony of which invention, I have hereunto set my hand, at Wilmington, Del., on this 21st day of May, 1907.

PAUL S. SMITH.

Witnesses:
 JAMES J. COOK,
 IRVING EYER.